United States Patent
Park et al.

(10) Patent No.: US 9,066,290 B2
(45) Date of Patent: Jun. 23, 2015

(54) METHOD FOR RECONFIGURING TIME ALIGNMENT TIMER

(75) Inventors: Sung-Jun Park, Gyeonggi-Do (KR);
Seung-June Yi, Gyeonggi-Do (KR);
Young-Dae Lee, Gyeonggi-Do (KR);
Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 12/811,768

(22) PCT Filed: Jan. 6, 2009

(86) PCT No.: PCT/KR2009/000048
§ 371 (c)(1),
(2), (4) Date: Jul. 6, 2010

(87) PCT Pub. No.: WO2009/088204
PCT Pub. Date: Jul. 16, 2009

(65) Prior Publication Data

US 2010/0284376 A1    Nov. 11, 2010

Related U.S. Application Data

(60) Provisional application No. 61/019,575, filed on Jan. 7, 2008.

(30) Foreign Application Priority Data

Jan. 25, 2009    (KR) .......................... 10-2009-0000482

(51) Int. Cl.
*H04W 56/00*    (2009.01)
*H04W 52/36*    (2009.01)
*H04W 74/08*    (2009.01)
(Continued)

(52) U.S. Cl.
CPC ........ *H04W 56/0045* (2013.01); *H04W 52/365* (2013.01); *H04W 74/0833* (2013.01); *H04W 74/002* (2013.01); *H04W 72/042* (2013.01)

(58) Field of Classification Search
None
See application file for complete search history.

(56) References Cited

U.S. PATENT DOCUMENTS 6,388,997 B1    5/2002    Scott
6,421,334 B1    7/2002    Baines
(Continued)

FOREIGN PATENT DOCUMENTS

EP    1732342 A1    12/2006
EP    1871032 A1    12/2007
(Continued)

OTHER PUBLICATIONS

3GPP TS 25.402 v7.5.0, "Technical Specification Group Radio Access Network; Synchronisation in UTRAN Stage 2 (Release 7)", 3rd Generation Partnership Project, Dec. 2007.*
(Continued)

*Primary Examiner* — John Blanton
*Assistant Examiner* — Thinh Tran
(74) *Attorney, Agent, or Firm* — Morgan, Lewis & Bockius LLP

(57) ABSTRACT

Disclosed is the radio (wireless) communication system providing a radio communication service and the terminal, and more particularly, to a method for reconfiguring a timer of a mobile terminal in an Evolved Universal Mobile Telecommunications System (E-UMTS) evolved from the Universal Mobile Telecommunications System (UMTS) or a Long Term Evolution (LTE) system.

12 Claims, 4 Drawing Sheets

(51) Int. Cl.
*H04W 74/00* (2009.01)
*H04W 72/04* (2009.01)

(56) References Cited

U.S. PATENT DOCUMENTS

| | | |
|---|---|---|
| 6,434,389 B1 | 8/2002 | Meskanen et al. |
| 7,209,747 B2 | 4/2007 | Chen |
| 7,310,336 B2 | 12/2007 | Malkamaki |
| 7,921,348 B2 | 4/2011 | Seidel et al. |
| 8,131,295 B2 | 3/2012 | Wang et al. |
| 8,320,327 B2 | 11/2012 | Pani et al. |
| 2001/0021661 A1 | 9/2001 | Pautonnier |
| 2001/0024956 A1 | 9/2001 | You et al. |
| 2002/0126629 A1 | 9/2002 | Jiang et al. ............... 370/328 |
| 2003/0044011 A1 | 3/2003 | Vialen et al. |
| 2003/0091048 A1 | 5/2003 | Jiang |
| 2003/0103476 A1 | 6/2003 | Choi et al. |
| 2003/0224790 A1 | 12/2003 | Choi |
| 2004/0153852 A1 | 8/2004 | Wu |
| 2004/0162074 A1 | 8/2004 | Chen |
| 2004/0199850 A1 | 10/2004 | Yi et al. |
| 2004/0203778 A1 | 10/2004 | Kuo et al. |
| 2004/0208142 A1 | 10/2004 | Saw |
| 2005/0026597 A1 | 2/2005 | Kim et al. |
| 2005/0041681 A1 | 2/2005 | Lee et al. |
| 2005/0190712 A1 | 9/2005 | Lee et al. |
| 2005/0220042 A1 | 10/2005 | Chang et al. |
| 2005/0249163 A1 | 11/2005 | Kim et al. |
| 2005/0287957 A1 | 12/2005 | Lee et al. |
| 2006/0035662 A1 | 2/2006 | Jeong et al. |
| 2006/0056347 A1 | 3/2006 | Kwak et al. |
| 2006/0094452 A1 | 5/2006 | Kang |
| 2006/0104225 A1 | 5/2006 | Kim et al. |
| 2006/0116136 A1 | 6/2006 | Noma |
| 2006/0251023 A1 | 11/2006 | Choi |
| 2007/0047547 A1 | 3/2007 | Conner et al. |
| 2007/0049325 A1 | 3/2007 | Lee |
| 2007/0115894 A1 | 5/2007 | Herrmann et al. |
| 2007/0201424 A1 | 8/2007 | Kobayashi et al. |
| 2007/0250751 A1 | 10/2007 | Cai et al. |
| 2007/0253393 A1 | 11/2007 | Tseng |
| 2007/0291688 A1 | 12/2007 | Jiang et al. |
| 2008/0043771 A1 | 2/2008 | Cho et al. |
| 2008/0119209 A1 | 5/2008 | Upp |
| 2008/0159323 A1 | 7/2008 | Rinne et al. |
| 2008/0186892 A1 | 8/2008 | Damnjanovic |
| 2008/0188247 A1 | 8/2008 | Worrall |
| 2008/0205433 A1 | 8/2008 | Pihlaja et al. |
| 2008/0220784 A1 | 9/2008 | Somasundaram et al. |
| 2008/0226074 A1 | 9/2008 | Sammour et al. |
| 2008/0232331 A1 | 9/2008 | Ueda |
| 2008/0233941 A1 | 9/2008 | Jen |
| 2008/0268843 A1 | 10/2008 | Ore et al. |
| 2008/0305804 A1 | 12/2008 | Lee et al. |
| 2008/0318578 A1 | 12/2008 | Worrall |
| 2009/0034452 A1 | 2/2009 | Somasundaram et al. |
| 2009/0041240 A1 | 2/2009 | Parkvall et al. |
| 2009/0086853 A1 | 4/2009 | Ye .............................. 375/340 |
| 2009/0088160 A1 | 4/2009 | Pani et al. |
| 2009/0111445 A1* | 4/2009 | Ratasuk et al. ............ 455/418 |
| 2009/0247211 A1 | 10/2009 | Kuroda |
| 2009/0290523 A1 | 11/2009 | Lee et al. |
| 2009/0318175 A1 | 12/2009 | Sandberg |
| 2010/0077272 A1 | 3/2010 | Peisa et al. |
| 2010/0091721 A1 | 4/2010 | Larmo et al. |
| 2010/0093386 A1 | 4/2010 | Damnjanovic et al. |
| 2010/0178923 A1 | 7/2010 | Yi et al. |
| 2010/0232301 A1 | 9/2010 | Omori |
| 2010/0284376 A1* | 11/2010 | Park et al. ................... 370/336 |
| 2010/0290427 A1 | 11/2010 | Sebire et al. |
| 2011/0268234 A1 | 11/2011 | Khandekar et al. |

FOREIGN PATENT DOCUMENTS

| | | |
|---|---|---|
| EP | 2 174 520 A | 1/2009 |
| JP | 2000-151694 A | 5/2000 |
| JP | 2002-268697 A | 9/2002 |
| JP | 2003-087317 A | 3/2003 |
| JP | 2004-349882 A | 12/2004 |
| JP | 2005-530463 A | 10/2005 |
| JP | 2006-506892 A | 2/2006 |
| KR | 10-2003-0019318 A | 3/2003 |
| KR | 10-2004-0008100 | 1/2004 |
| KR | 10-2004-0008100 A | 1/2004 |
| KR | 10-2005-0014984 | 2/2005 |
| KR | 10-2005-0014984 A | 2/2005 |
| KR | 10-2005-0028254 | 3/2005 |
| KR | 10-2005-0028254 A | 3/2005 |
| KR | 10-2004-0008228 A | 8/2005 |
| KR | 10-2005-0080946 A | 8/2005 |
| KR | 10-2006-0024756 | 3/2006 |
| KR | 10-2006-0024756 A | 3/2006 |
| KR | 10-0556589 B1 | 3/2006 |
| KR | 10-2006-0039749 A | 5/2006 |
| KR | 10-2006-0069106 A | 6/2006 |
| KR | 10-2007-0061365 A | 6/2007 |
| KR | 10-2007-0120453 A | 12/2007 |
| WO | 03/027860 A1 | 4/2003 |
| WO | 2004/004163 A1 | 1/2004 |
| WO | 2004088879 A1 | 10/2004 |
| WO | 2005/091668 A1 | 9/2005 |
| WO | 2005/122441 A1 | 12/2005 |
| WO | 2006/035501 A1 | 4/2006 |
| WO | 2006096036 | 9/2006 |
| WO | 2006/118738 A1 | 11/2006 |
| WO | 2006118426 | 11/2006 |
| WO | 2007/102479 A1 | 9/2007 |
| WO | 2009007720 A2 | 1/2009 |

OTHER PUBLICATIONS

R2-074504, "Change Request", 3GPP TSG-RAN2 Meeting #59bis, Oct. 2007.*
3GPP TS 36.321, "3rd Generation Partnership Project; Technical Specification Group Radio Access Network; Evolved Universal Terrestrial Radio Access (E-UTRA) Medium Access Control (MAC) protocol specification (Release 8)" 3rd Generation Partnership Project, Dec. 2007.*
Office Action issued in corresponding Japanese Patent Application No. 2010-527898 dated Sep. 28, 2012.
3GPP TSG-RAN WG2 Meeting #59bis, Shanghai, China, Oct. 8-12, 2007.
Office Action issued in corresponding U.S. Appl. No. 12/678,694 dated Jul. 31, 2012.
Office Action issued in corresponding U.S. Appl. No. 12/738,278 dated Jul. 12, 2012.
3GPP "CS over HSDPA" TSG-RAN WG2 Meeting #59bis, Shanghai, China, Oct. 8-12, 2007.
Nokia seimens networks "CS over HSPA impact to specification" 3GPP TSG-RAN-WG2 Meeting #59bis, Shanghai, China, Oct. 8-12, 2007.
Office Action issued in corresponding Japanese Patent Application No. 2010-527898 dated Feb. 10, 2012.
USPTO: Office Action for U.S. Appl. No. 12/677,739—Issued on Jun. 6, 2013.
European Office Action (Application No. 08022393.6-1857 /2077690) dated Aug. 6, 2013.
"Prioritisation in UTRAN-LTE interworking" , Nokia Corporation, Nokia Siemens Networks, from 3GPP TSG-RAN WG2 Meeting #60, Jeju, South Korea on Nov. 5-9, 2007.
Technical Specification Group Radio Access Network; Radio Link Control (RLC) protocol specification (Release 7); 3GPP TS 25.322, V7.3.0, Jun. 2007, 2007, pp. 1-81.
EPO: Extended European Search Report for corresponding European Patent Application No. 09150179.1 dated Nov. 19, 2013.
Office Action dated Mar. 24, 2014, issued by the U.S. Patent & Trademark Office in U.S. Appl. No. 12/677,739.

(56) References Cited

OTHER PUBLICATIONS

OA issued by USPTO on Dec. 21, 2012 for U.S. Appl. No. 12/677,739.
OA issued by USPTO on Dec. 28, 2012 for U.S. Appl. No. 12/811,613.
CS Over HSPA Impact to Specification—Nokia Siemens Networks—3GPP TSG-RAN-WG2 Meeting—Shanghai—Oct. 2007.
Office Action for U.S. Appl. No. 12/738,278—Issued by USPTO on Oct. 24, 2012.
Office Action dated Jun. 25, 2014, issued by the U.S. Patent & Trademark Office in U.S. Appl. No. 12/677,739.
Office Action dated Dec. 17, 2014, issued by the U.S. Patent & Trademark Office in U.S. Appl. No. 12/677,739.
LG Electronics, "Transmission of LTE Paging," 3GPP TSG-RAN WG2 #59, R2-073356, Aug. 2007.
LG Electronics Inc., "Discussion on MCCH Update," 3GPP TSG-RAN WG2 #59, R2-073509, Aug. 2007.
Nokia, Nokia Siemens Networks, "Paging Occasions in LTE," 3GPP TSG-RAN WG2 Meeting #59, R2-073073, Aug. 2007.
"3rd Generation Partnership Project; Technical Specification Group Services and System Aspects; 3G Security; Security architecture (Release 7)," 3GPP TS 33.102 v7.1.0 (Dec. 2006).
Nokia Siemens Networks, Nokia, "CS over HSPA impact to specification," 3GPP TSG-RAN-WG2 Meeting #59bis R2-074017 (Oct. 2007).
Office Action dated Feb. 6, 2015, issued by the Korean Intellectual Property Office in Korean Patent Application No. 10-2009-0000482.

* cited by examiner

PRIOR ART

PRIOR ART

METHOD FOR RECONFIGURING TIME ALIGNMENT TIMER

The present application is a national stage of PCT International Application No. PCT/KR2009/000048, filed Jan. 6, 2009, which claims the benefit of U.S. Provisional Application No. 61/019,575, filed Jan. 7, 2008, and claims the benefit of Korean Application No. 10-2009-0000482, filed Jan. 5, 2009.

TECHNICAL FIELD

The present invention relates to a radio (wireless) communication system providing a radio communication service and a terminal, and more particularly, to a method for reconfiguring a timer of a mobile terminal in an Evolved Universal Mobile Telecommunications System (E-UMTS) or a Long Term Evolution (LTE) system.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a Broadcast Channel (BCH) used for transmitting system information, and a downlink Shared Channel (SCH) used for transmitting user traffic or control messages. A downlink multicast, traffic of broadcast service or control messages may be transmitted via the downlink SCH or via a separate downlink Multicast Channel (MCH). As for channels used in uplink transmission for transmitting data from the mobile terminal to the network, there is a Random Access Channel (RACH) used for transmitting an initial control message, and an uplink Shared Channel (SCH) used for transmitting user traffic or control messages.

As for downlink physical channels for transmitting information transferred via the channels used in downlink transmission over a radio interface between the network and the terminal, there is a Physical Broadcast Channel (PBCH) for transmitting BCH information, a Physical Multicast Channel (PMCH) for transmitting MCH information, a Physical Downlink Shared Channel (PDSCH) for transmitting PCH and a downlink SCH information, and a Physical Downlink Control Channel (PDCCH) (also, referred to as 'DL L1/L2 control channel') for transmitting control information provided by the first and second layers such as a DL/UL Scheduling Grant, and the like. As for uplink physical channels for transmitting information transferred via the channels used in uplink transmission over a radio interface between the network and the terminal, there is a Physical Uplink Shared Channel (PUSCH) for transmitting uplink SCH information, a Physical Random Access Channel (PRACH) for transmitting RACH information, and a Physical Uplink Control Channel (PUCCH) for transmitting control information provided by the first and second layers, such as a HARQ ACK or NACK, a Scheduling Request (SR), a Channel Quality Indicator (CQI) report, and the like.

Description of an uplink timing alignment maintenance in a LTE system will be given. In the LTE system that based on an Orthogonal Frequency Division Multiplex (OFDM) technology, there is possibility of interferences between terminals (UEs) during a communication between UE and base station (eNB). In order to minimize interferences between terminals, it is important that the base station must manage or handle a transmission timing of the UE. More particularly, the terminal may exist in random area within a cell, and this implies that a data transmission time (i.e., traveling time of data from UE to base station) can be varied based on a location of the terminal. Namely, if the terminal is camped on edge of the cell, data transmission time of this specific terminal will be much longer than data transmission time of those terminals who camped on a center of the cell. In contrast, if the terminal is camped on the center of the cell, data transmission time of this specific terminal will be much shorter than data transmission time of those terminals who camped on the edge of the cell. The base station (eNB) must manage or handle all data or signals, which are transmitted by the terminals within the cell, in order to prevent the interferences between the terminals. Namely, the base station must adjust or manage a transmission timing of the terminals upon each terminal's condition, and such adjustment can be called as the timing alignment maintenance. One of the methods for maintaining the timing alignment is a random access procedure. Namely, during the random access procedure, the base station receives a random access preamble transmitted from the terminal, and the base station can calculate a time alignment (Sync) value using the received random access preamble, where the time alignment value is to adjust (i.e., faster or slower) a data transmission timing of the terminal. The calculated time alignment value can be notified to the terminal by a random access response, and the terminal can update the data transmission timing based on the calculated time alignment value. In other method, the base station may receive a sounding reference symbol (SRS) transmitted from the terminal periodically or randomly, the base station may calculate the time alignment (Sync) value based on the SRS, and the terminal may update the data transmission timing according to the calculated time alignment value.

As explained above, the base station (eNB) may measure a transmission timing of the terminal though a random access preamble or SRS, and may notify an adjustable timing value to the terminal. Here, the time alignment (Sync) value (i.e., the adjustable timing value) can be called as a time advance command (referred as 'TAC' hereafter). The TAC may be process in a MAC (Medium Access control) layer. Since the terminal does not camps on a fixed location, the transmission timing is frequently changed based on a terminal's moving location and/or a terminal's moving velocity. Concerning with this, if the terminal receives the time advance command (TAC) from the base station, the terminal expect that the time advance command is only valid for certain time duration. A time alignment timer (TAT) is used for indicating or representing the certain time duration. As such, the time alignment timer (TAT) is started when the terminal receives the TAC (time advance command) from the base station. The TAT value is transmitted to the terminal (UE) through a RRC (Radio Resource Control) signal such as system information (SI) or a radio bearer reconfiguration. Also, if the terminal receives a new TAC from the base station during an operation of the TAT, the TAT is restarted. Further, the terminal does not transmit any other uplink data or control signal (e.g., data on physical uplink shared channel (PUSCH), control signal on Physical uplink control channel (PUCCH) except for the random access preamble when the TAT is expired or not running.

As explained above, in LTE system, a base station (eNB) transmits a timing advance command (TAC) to a terminal (UE) for maintenance of an uplink timing alignment, the terminal applies the received TAC, and the time alignment timer (TAT) starts upon receiving the TAC. A detail description of the TAT value will be given. When the terminal access to a particular cell, the terminal receives the TAT value through system information (SI) and starts the TAT through a random access procedure. The TAT value is a common value used in a cell. If the base station wants to set the terminal with a certain TAT value, the base station transmits the certain TAT value included in a radio bearer reconfiguration message. The above certain TAT value is a dedicated value that assigned to a corresponding terminal. The reason that the base station set the assigned TAT value to the terminal is because the terminal can not possibly perform an uplink data transmission even if the time Sync of the terminal is aligned in following conditions; 1) if particular terminal does not move in a particular cell, 2) if the TAT is expired even if the time alignment of the terminal is not changed, etc. Therefore, the base station has to provide a new TAC to the terminal before an expiration of the TAT. Here, in order to prevent a waste of radio resource for transmitting an unnecessary TAC transmission, for those terminal do not move frequently may set with a high TAT value so as to minimize number of TAC transmission.

However, if the base station wants to set a particular terminal with a specifically assigned TAT value while the particular terminal is in active state and the particular terminal use a common TAT received via system information, in related art, the base station must perform an Intra-cell-Handover inn order to change a current TAT value to the specifically assigned TAT value. However, since the Intra-cell-Handover contains a random access procedure, a reconfiguring the TAT by Intra-Cell-Handover may cause great drawbacks of collision errors, a delayed time due to a collision, or massive radio resource(s) usage, etc.

DISCLOSURE OF INVENTION

Technical Solution

Therefore, an object of the present invention is to provide a method for reconfiguring a timer of a mobile terminal in a wireless communication system, and more particularly, for reconfiguring a time alignment timer (TAT) by utilizing an effective usage of radio resources.

To achieve this and other advantages and in accordance with the purpose of the present invention, as embodied and broadly described herein, there is provided a method of reconfiguring a timer of a mobile terminal in wireless communication system, the method comprising: receiving a Radio Resource Control (RRC) message from a network, wherein the RRC message includes a first timer value; performing a timer based on the first timer value by receiving a command for starting the timer with respect to the first timer value; receiving a second timer value; and restarting the timer based on the second timer value without receiving another command for restarting the timer with respect to the second timer value.

To achieve this and other advantages and in accordance with the purpose of the present invention, as embodied and broadly described herein, there is also provided a method of reconfiguring a timer of a mobile terminal in wireless communication system, the method comprising: receiving a Radio Resource Control (RRC) message from a network, wherein the RRC message includes a first timer value; performing a timer based on the first timer value by receiving a first command for starting the timer with respect to the first timer value; receiving a second command for restarting the timer; determining if there is an available timer value other than the first timer value after receiving the second command; and restarting the timer with respect to the available timer value if there is the available timer value by the determining step or restarting the timer with respect to the first timer value if there is no available timer value by the determining step.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

Figure 1:
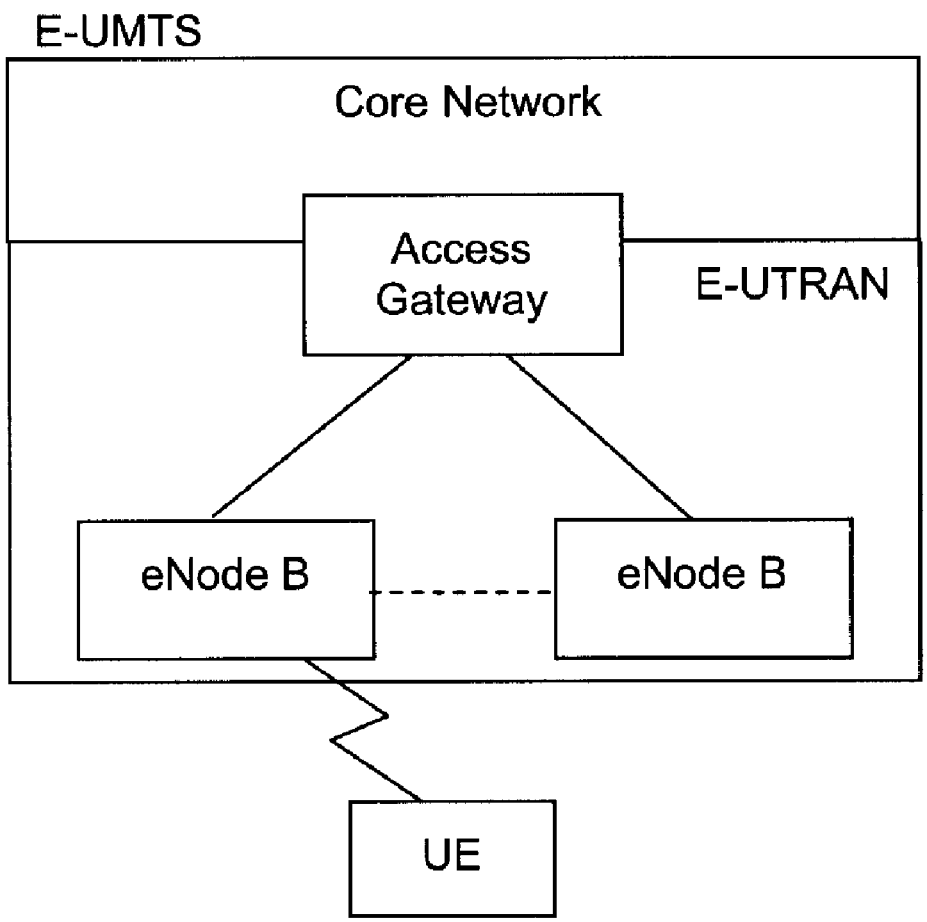
FIG. 1 shows an exemplary network structure of an Evolved Universal Mobile Telecommunications System (E-UMTS) as a mobile communication system to which a related art and the present invention are applied.
Figure 2:
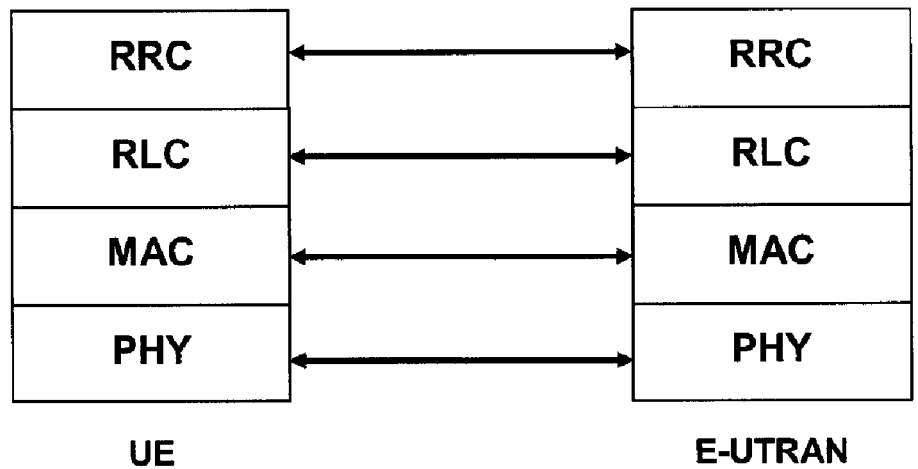
FIG. 2 shows an exemplary view of related art control plane architecture of a radio interface protocol between a terminal and an E-UTRAN.
Figure 3:
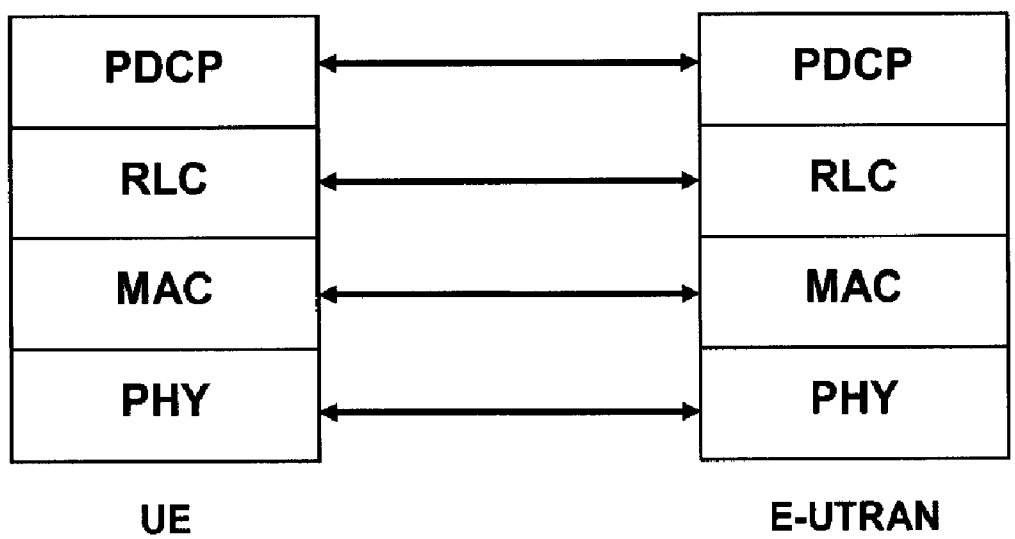
FIG. 3 shows an exemplary view of related art user plane architecture of a radio interface protocol between a terminal and an E-UTRAN.
Figure 4:
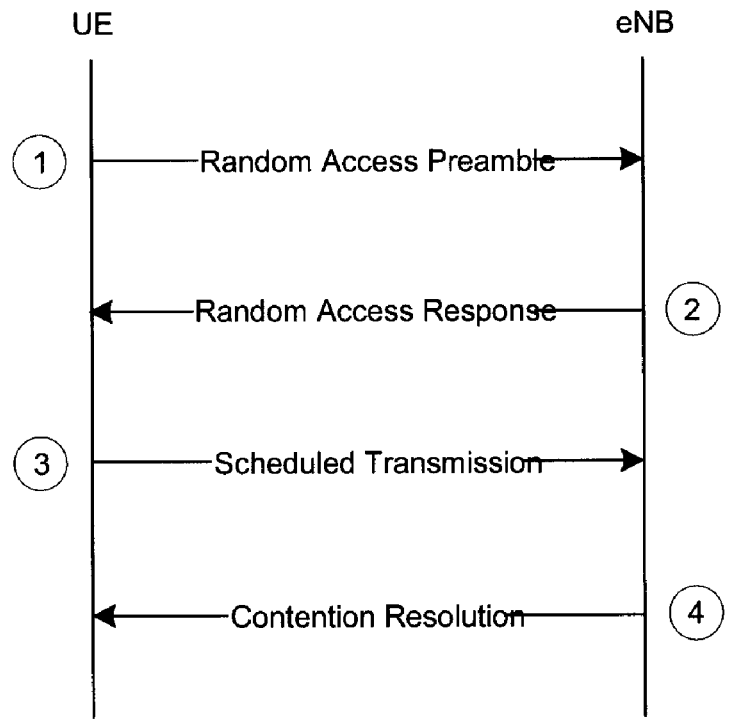
FIG. 4 shows an exemplary view of a contention based random access procedure.

Based on the above description, FIG. 4 shows an operation procedure between a terminal and a base station in a contention based random access procedure.

First, a terminal in the contention based random access randomly may select a random access preamble within a group of random access preambles indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself, the terminal may process each of the information included in the random access response. That is, the terminal applies the Time Alignment Command, and stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMSI or random ID) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

Figure 5:
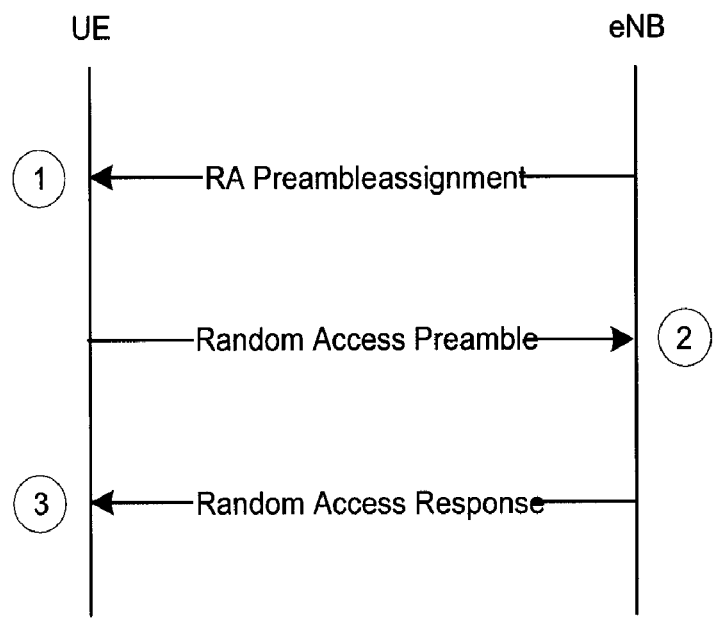
FIG. 5 shows an exemplary view of a non-contention based random access procedure.

FIG. 5 shows an operation procedure between a terminal and a base station in a non-contention based random access procedure. As compared with the contention based random access procedure, the random access procedure is determined to be successfully performed by receiving the random access response information in the non-contention based random access procedure, thus to complete the random access process.

In general, the non-contention based random access procedure may be performed in the following two cases: one is the handover procedure, and the other is a request by the command of the base station. To be certain, the contention based random access procedure may also be performed in those two cases. First, for the non-contention based random access procedure, it is important to receive, from the base station, a dedicated random access preamble without having any possibility of contention. Here, a handover command and a PDCCH command may be used to assign the random access preamble. Then, after the random access preamble dedicated to only the terminal itself has been assigned from the base station, the terminal transmits the preamble to the base station. Thereafter, the method for receiving the random access response information is the same as that in the above-described contention based random access procedure.

According to a first embodiment of the present invention, if the base station (eNB) wants to change a currently operated timer value of the terminal, the base station may transmit a new timer value to the terminal, then the terminal may terminate the operation of timer with the currently operated timer value upon receiving the new timer value, and then the terminal may start or restart the timer of the terminal with the received new timer value.

Preferably, the timer value may be transmitted from the base station to the terminal by at least one of a RRC (Radio Resource Control) signal, a MAC (Medium Access Control) signal, or PDCCH (Physical Downlink Control Channel), etc. When the timer value is transmitted to the terminal by the MAC signal, a control element (CE) having only a TAT value or a control element (CE) having both TAT value and TAC can be used. More specifically, a MAC PDU (Medium Access Control Protocol Data Unit) may be comprised of a MAC header, a MAC SDU (Service Data Unit) and a MAC Control Element (CE). Here, the MAC control element is a control message that is processed in a MAC layer, and there are many different types of MAC control element (e.g., time advance command MAC control element (TAC MAC CE), C-RNTI MAC control element, etc) Also, when a logical channel ID (LCID) is included in the MAC header, at least one LCID is existed in each MAC control element. Namely, when the TAT value is delivered to the MAC layer, the TAT MAC control element (having only TAT value) and the TAT and TAC MAC control element (having both TAC and TAT value) can be defined according to the present invention. Further, the LCID of each MAC control element can be defined as well. In case that the timer value is transmitted through the PDCCH, a particular field of the PDCCH can be used to indicate the TAT value. For example, if the base station wants to use the PDCCH, which is used to indicate an downlink radio resource, to transmit the TAT value, all field of the PDCCH assigned to inform a HARQ information may set with "0" and a radio resource information field may set with the TAT value.

More detailed description of a time alignment timer (TAT) reconfiguring operation procedure between the terminal and base station is followed.

Figure 6:
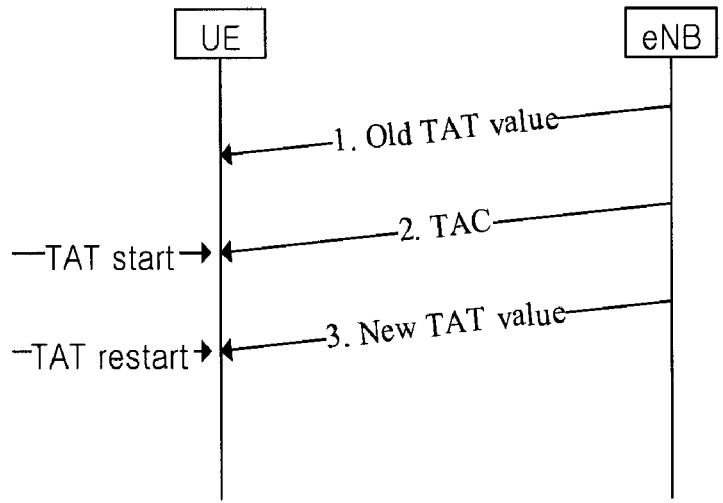
FIG. 6 shows an exemplary view of a procedure for immediately restarting a time alignment timer (TAT) based on a reconfiguration of TAT value according to the present invention.

FIG. 6 shows an exemplary view of a procedure for immediately restarting a time alignment timer (TAT) based on a reconfiguration of TAT value according to the present invention.

Firstly, a RRC (Radio Resource Control) layer of the terminal (UE) may receive a time alignment timer common or a time alignment timer from the base station (eNB) through a RRC message such as system information (SI) or a RRC connection reconfiguration. Based on the received TAT value, the RRC layer of the terminal may instruct a MAC layer of the terminal to set with the TAT value. Accordingly, the MAC layer of the terminal may configure a timer with the TAT value. Later, the terminal may receive a time alignment command (TAC) from the base station. If the timer was operated with other TAT value before receiving the TAC, the terminal may terminate to operate the timer upon receiving the TAC, and then may start the timer with the received TAT value. If the timer was not operated before receiving the TAC, the terminal may immediately start the timer with the received TAT value. Then, the terminal may receive a new TAT value from the base station before a currently operated TAT is expired. If the new TAT value is received via a RRC signal, the RRC layer of the terminal may instruct the MAC layer of terminal to set with the new TAT value, and the MAC layer of the terminal may terminate to operate the timer and may restart the timer with the new TAT value.

According to a second embodiment of the present invention, if the base station (eNB) wants to change a currently operated timer value of the terminal, the base station may transmit a new timer value to the terminal, then the terminal may receive the new timer value and may temporarily store the new timer value. Here, the currently operated timer is maintained to operate. The terminal may start or restart the timer with the new timer value when a control signal (i.e., another TAC) for starting or restarting the timer is received from the base station.

Preferably, the timer value may be transmitted from the base station to the terminal by at least one of a RRC (Radio Resource Control) signal, a MAC (Medium Access Control) signal, or PDCCH (Physical Downlink Control Channel), etc. When the timer value is transmitted to the terminal by the MAC signal, a control element (CE) having only a TAT value or a control element (CE) having both TAT value and TAC can be used. More specifically, a MAC PDU (Medium Access Control Protocol Data Unit) may be comprised of a MAC header, a MAC SDU (Service Data Unit) and a MAC Control Element (CE). Here, the MAC control element is a control message that is processed in a MAC layer, and there are many different types of MAC control element (e.g., time advance command MAC control element (TAC MAC CE), C-RNTI MAC control element, etc) Also, when a logical channel ID (LCID) is included in the MAC header, at least one LCID is existed in each MAC control element. Namely, when the TAT value is delivered to the MAC layer, the TAT MAC control element (having only TAT value) and the TAT and TAC MAC control element (having both TAC and TAT value) can be defined according to the present invention. Further, the LCID of each MAC control element can be defined as well. In case that the timer value is transmitted through the PDCCH, a particular field of the PDCCH can be used to indicate the TAT value. For example, if the base station wants to use the PDCCH, which is used to indicate an downlink radio resource, to transmit the TAT value, all field of the PDCCH assigned to inform a HARQ information may set with "0" and a radio resource information field may set with the TAT value.

Figure 7:
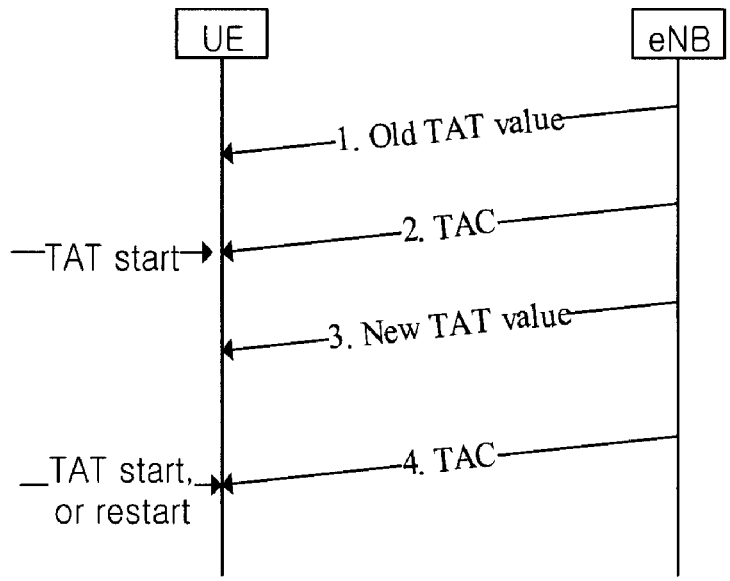
FIG. 7 shows an exemplary view of a procedure for restarting a time alignment timer (TAT) by receiving a timer alignment command (TAC) after a reconfiguration of TAT value according to the present invention.

FIG. 7 shows an exemplary view of a procedure for restarting a time alignment timer (TAT) by receiving a timer alignment command (TAC) after a reconfiguration of TAT value according to the present invention.

Firstly, a RRC (Radio Resource Control) layer of the terminal (UE) may receive a time alignment timer common or a time alignment timer from the base station (eNB) through a RRC message such as system information (SI) or a RRC connection reconfiguration. Based on the received TAT value, the RRC layer of the terminal may instruct a MAC layer of the terminal to set with the TAT value. Accordingly, the MAC layer of the terminal may configure a timer with the TAT value. Later, the terminal may receive a time alignment command (TAC) from the base station. If the timer was operated with other TAT value before receiving the TAC, the terminal may terminate to operate the timer upon receiving the TAC, and then may start the timer with the received TAT value. If the timer was not operated before receiving the TAC, the terminal may immediately start the timer with the received TAT value. Then, the terminal may receive a new TAT value from the base station before a currently operated TAT is expired. If the new TAT value is received via a RRC signal, the RRC layer of the terminal may instruct the MAC layer of terminal to set with the new TAT value. Here, the terminal may not immediately apply the new TAT value to the timer. Namely, if the timer of the terminal is currently operating with a certain TAT value (current TAT value), the terminal may maintain to operate the timer with the current TAT value even if the new TAT value is received from the base station. Later, the terminal may receive another TAC from the base station. Upon receiving the another TAC, the terminal may terminate to operate the timer with the current TAT value, and then may start or restart the timer with the received new TAT value. Namely, the terminal may check whether there is new TAT value from the RRC when the terminal is about to start or restart the timer, and if there is new TAT value, the terminal may start or restart the timer with the new TAT value.

The present disclosure may provide a method of reconfiguring a timer of a mobile terminal in wireless communication system, the method comprising: receiving a Radio Resource Control (RRC) message from a network, wherein the RRC message includes a first timer value; performing a timer based on the first timer value by receiving a command for starting the timer with respect to the first timer value; receiving a second timer value; and restarting the timer based on the second timer value without receiving another command for restarting the timer with respect to the second timer value, wherein the RRC message is at least one of system information (SI), radio bearer reconfiguration, and RRC connection reconfiguration, the timer is a time alignment timer, the command is a time advance command (TAC), the second timer value is received by at least one of a RRC message, a MAC (Medium Access Control) message, and PDCCH (Physical Downlink Control Channel) message, and at least one of the first timer value, the second timer value and the command is received by a control element (CE) contained in a MAC protocol data unit (PDU).

It can be also said that the present disclosure may provide a method of reconfiguring a timer of a mobile terminal in wireless communication system, the method comprising: receiving a Radio Resource Control (RRC) message from a network, wherein the RRC message includes a first timer value; performing a timer based on the first timer value by receiving a first command for starting the timer with respect to the first timer value; receiving a second command for restarting the timer; determining if there is an available timer value other than the first timer value after receiving the second command; and restarting the timer with respect to the available timer value if there is the available timer value by the determining step or restarting the timer with respect to the first timer value if there is no available timer value by the determining step, wherein the RRC message is at least one of system information (SI), radio bearer reconfiguration, and RRC connection reconfiguration, the timer is a time alignment timer, the command is a time advance command (TAC), the second timer value is received by at least one of a RRC message, a MAC (Medium Access Control) message, and PDCCH (Physical Downlink Control Channel) message, and at least one of the first timer value, the second timer value and the command is received by a control element (CE) contained in a MAC protocol data unit (PDU).

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of reconfiguring a timer of a mobile terminal in wireless communication system, the method comprising:
   receiving a first timer value from a network;
   configuring, at a media access control (MAC) layer of the mobile station, a timer with the first timer value;
   starting, at the MAC layer of the mobile station, the timer based on the first timer value by receiving a command;
   receiving a second timer value from the network before the timer is expired;
   configuring, at the MAC layer of the mobile station, the timer with the second timer value; and
   restarting, at the MAC layer of the mobile station, the timer based on the second timer value without receiving another command,
   wherein the first timer value, the second timer value, and the command are received by an MAC protocol data unit (PDU),
   wherein the MAC PDU includes a MAC header, a MAC service data unit (SDU), and a MAC control element (CE), and
   wherein the MAC CE includes the first timer value, the second timer value, and the command.

2. The method of claim 1, wherein the MAC header and the MAC CE includes a logical channel identifier (LCID).

3. The method of claim 1, wherein the timer is a time alignment timer.

4. The method of claim 1, wherein the command is a time advance command (TAC).

5. The method of claim 1, wherein the MAC CE including the first timer value and the second timer value is a time alignment timer (TAT) MAC CE.

6. The method of claim 1, wherein the MAC CE including the command is a time alignment command (TAC) MAC CE.

7. A method of reconfiguring a timer of a mobile terminal in wireless communication system, the method comprising:
   receiving a first timer value from a network;
   configuring, at a media access control (MAC) layer of the mobile station, a timer with the first timer value;
   starting, at the MAC layer of the mobile station, the timer based on the first timer value by receiving a first command;
   receiving a second timer value from the network before the timer is expired;
   storing the second timer value temporarily;
   receiving a second command for restarting the timer from the network;
   configuring, at the MAC layer of the mobile station, the timer with the second timer value; and
   restarting, at the MAC layer of the mobile station, based on the second timer value if there the second timer value exists when the second command is received,
   wherein the first timer value, the second timer value, the first command, and the second command are received by an MAC protocol data unit (PDU),
   wherein the MAC PDU includes a MAC header, a MAC service data unit (SDU), and a MAC control element (CE), and
   wherein the MAC CE includes the first timer value, the second timer value, the first command, and the second command.

8. The method of claim 7, wherein the MAC header and the MAC CE includes a logical channel identifier (LCID).

9. The method of claim 7, wherein the timer is a time alignment timer.

10. The method of claim 7, wherein the command is a time advance command (TAC).

11. The method of claim 7, wherein the MAC CE including the first timer value and the second timer value is a time alignment timer (TAT) MAC CE.

12. The method of claim 7, wherein the MAC CE including the first command or the second command is a time alignment command (TAC) MAC CE.

* * * * *